United States Patent

[11] 3,596,061

[72] Inventors Walter Gechele;
Arnaldo Pasini; Bruno Piazza; Francesco Serracchioli, all of Turin, Italy
[21] Appl. No. 767,405
[22] Filed Oct. 14, 1968
[45] Patented July 27, 1971
[73] Assignee Ing. C. Olivetti & C., S.p.A. Ivrea, Turin, Italy
[32] Priority Oct. 31, 1967
[33] Italy
[31] 53560-A/67

[54] DEVICE FOR AUTOMATICALLY POSITIONING RECORD SUPPORTS OF THE TICKET OR CARD TYPE IN A READING APPARATUS
7 Claims, 4 Drawing Figs.

[52] U.S. Cl. .......... 235/61.11D, 340/174.1 H
[51] Int. Cl. .......... G06k 7/08, G11b 5/00, G11b 25/04
[50] Field of Search .......... 235/61.11, 61.111, 61.112, 61.114, 61.113, 61.115, 61.6; 250/219 IDC; 179/100.2 A; 340/174.1 H

[56] References Cited
UNITED STATES PATENTS

| | | | |
|---|---|---|---|
| 2,905,767 | 9/1959 | Eckert et al. | 179/100.2 (A) |
| 2,914,746 | 11/1959 | James | 235/61.11 (4) UX |
| 3,104,093 | 12/1961 | Zenner | 235/61.11 (3) X |
| 3,418,456 | 12/1968 | Hamisch et al. | 250/219 (IDC) X |
| 3,433,932 | 3/1969 | Rolke | 235/61.11 |
| 3,502,849 | 3/1970 | Malloy | 235/61.6 |

*Primary Examiner*—Maynard H. Wilbur
*Assistant Examiner*—Thomas J. Sloyan
*Attorney*—Birch, Swindler, McKie & Beckett

ABSTRACT: The record member is manually placed in the reading apparatus, after which a centering plunger is inserted into a hole in the record member. The record member, which has concentric rings of magnetic data recorded thereon, is then clamped against a nonmagnetic diaphragm positioned over a rotating reading head. After the reading head has read off the recorded data, the centering plunger is withdrawn and the clamping member released. A trap door beneath the record member opens; and if the member fails to fall by gravity, an ejector crank strikes the record member to remove it from the reading position. The mechanisms are automatically reset at the completion of one reading cycle for the next cycle of operation.

Figures 1A, 1B, 2:
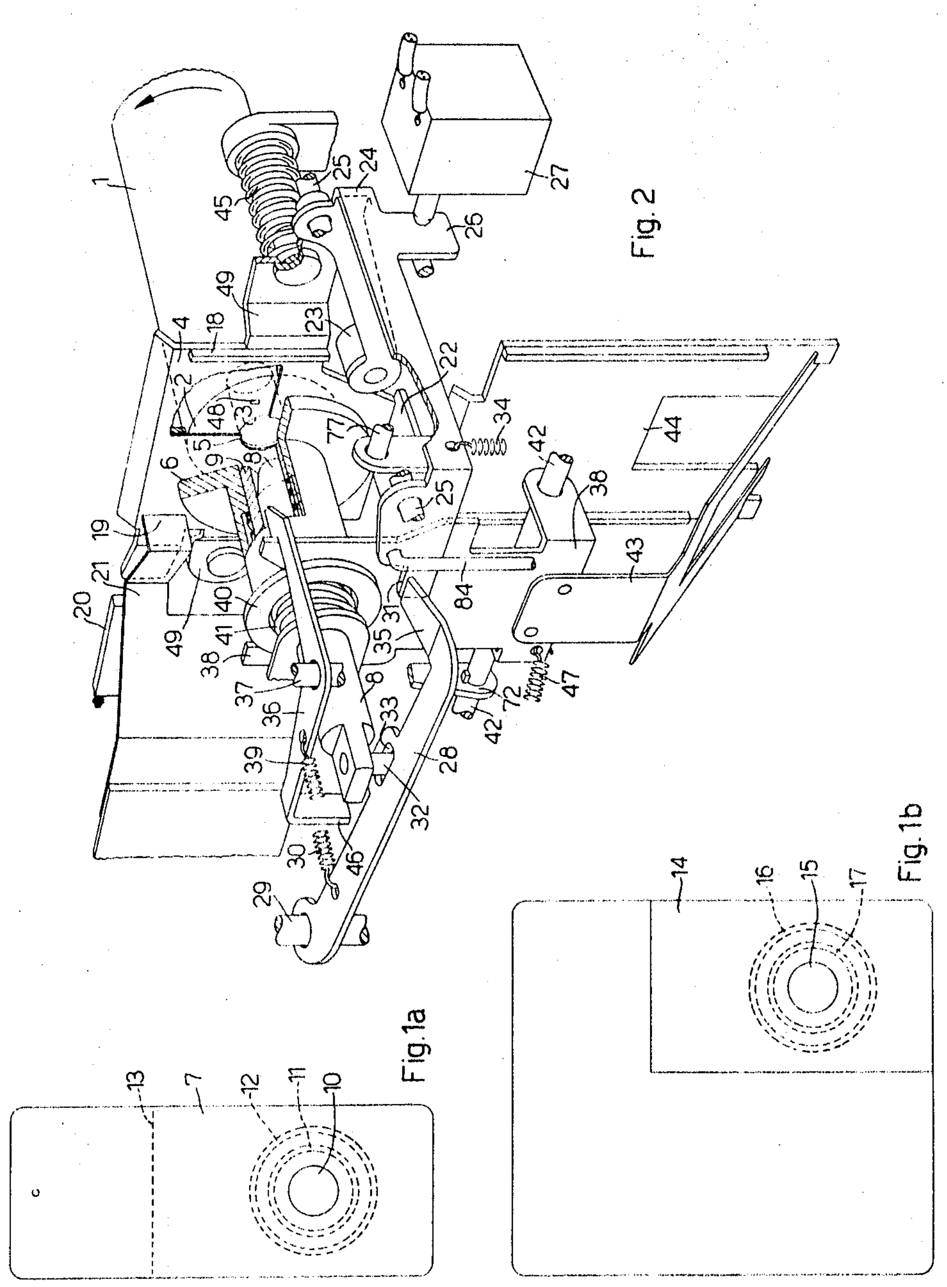

INVENTORS
WALTER GECHELE - ARNALDO PASINI
BRUNO PIAZZA - FRANCESCO SERRACCHIOLI

PATENTED JUL 27 1971 3,596,061

SHEET 2 OF 2

*INVENTORS*
WALTER GECHELE - ARNALDO PASINI
BRUNO PIAZZA - FRANCESCO SERRACCHIOLI

DEVICE FOR AUTOMATICALLY POSITIONING RECORD SUPPORTS OF THE TICKET OR CARD TYPE IN A READING APPARATUS

BACKGROUND OF THE INVENTION

The present invention relates to a device for automatically positioning magnetic records of the ticket or card type in a reading apparatus functioning as a peripheral unit for introducing data into an electronic data processor.

In the field of accounting or bookkeeping, to keep an accurate record of operations which are carried out at a plurality of distribution points is a considerable problem. It is required that the records be made in an exact and automatic manner and not be entrusted solely to the decision and memory of the operator.

For example, in a large store selling or distributing goods of various kinds, there will be a plurality of points for recording and debiting the goods removed. In the simplest case, each goods unit removed will have with it a ticket on which various pieces of information, among them the price, are marked. The operator engaged in making a record will have to read each ticket and introduce the data read into the recording apparatus. This kind of procedure entails very great care on the part of the operator if he is not to make errors of reading or transcription and moreover requires time and effort from the operator, for which reason human errors increase all the more the more intense are the demands made upon the operator.

In order to obviate this drawback, it has been proposed to use tickets having a magnetizable face on which the data appearing in print on the opposite face is recorded in magnetic form. That part of the ticket which bears the magnetic record can easily be torn along a perforated line from the rest of the ticket, which is clipped to the goods.

Once the part of the ticket bearing the magnetic record has been detached, it must be inserted in a magnetic reading device. For simplicity, it has been proposed to use a reading device with a multiple rotating head which is capable of reading along concentric circular tracks on the ticket, which must be kept stationary during the reading operation. To this end, the detachable part of the ticket must be provided with registering means to enable the record tracks to be centered with respect to the head prior to the reading operation. One of the simplest forms of centering means is constituted by a hole concentric with the tracks and produced with sufficient accuracy, into which a centering peg or pin is inserted.

An object of the present invention is to provide a device for automatically positioning and centering such tickets with respect to a rotating reading head which eliminates the possible errors due to manual centering and facilitates speediness of the reading operations.

SUMMARY

According to the present invention there is provided apparatus for reading data from a record member having a register hole and having at least one record track disposed thereon. There is provided a reading head having a scanning movement for reading the said track(s) and a centering device. The centering device includes a plunger with a tapered end facing the reading head and concentric therewith. Means are provided for moving the plunger axially towards the head so as to cause the tapered end to enter the hole in a record placed in the apparatus and thereby center the record.

Preferably, the record member is of the magnetizable type, and the data is stored thereon in concentric circles around the register hole. Likewise, the scanning movement of the reading head is rotational, around the register hole.

It can be arranged that the manual operations required for the reading process are reduced to a single operation consisting in introducing the ticket into a suitable slot, (except for any other operations required in the case of error or abnormal situations).

The device can be such as to permit the minimum duration of stay of the ticket against the head, so as to reduce the wear of the head itself or of any other parts which may be interposed between the ticket and the head and brought into contact with the head during the reading process. Thus a ticket which has been read can be automatically ejected from the reading position and provision may be made for recovery of any ticket the reading of which has given rise to the signalling of an error.

DRAWINGS

Figure 3:
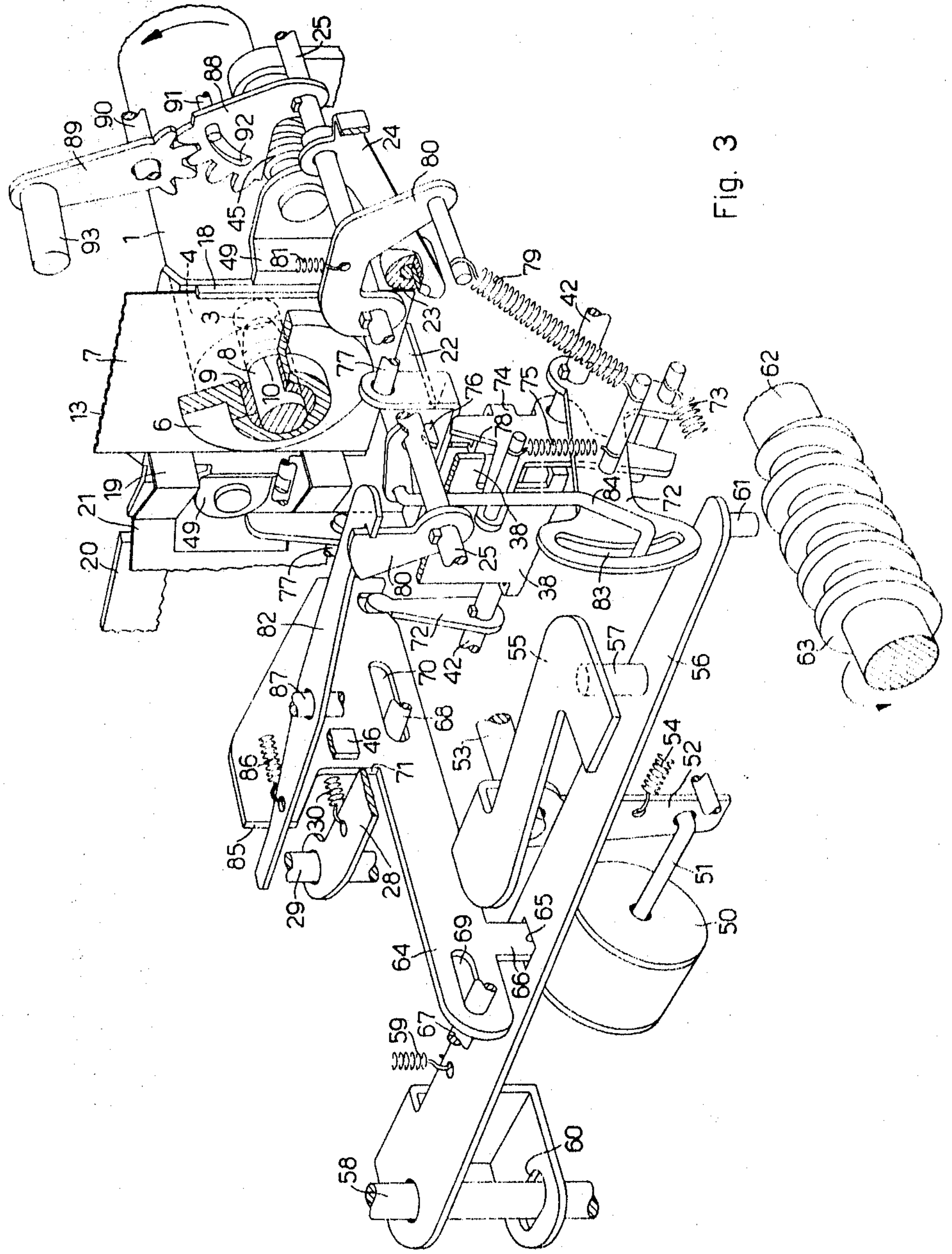

Other objects, advantages and aspects of the invention will become apparent by reference to the following detailed description and drawings of specific embodiments thereof wherein:

FIGS. 1*a* and 1*b* show examples of magnetic records of the ticket type and card type, respectively;

FIG. 2 is a perspective view of an automatic positioning device according to the invention in the inoperative position; and FIG. 3 is a perspective view of the automatic positioning device in the position in which the record support is centered and clamped.

DESCRIPTION OF THE INVENTION

The positioning device embodying the invention (FIGS. 2 and 3) comprises a rotating reading head 1 which in general will be a multiple head for reading a plurality of record tracks. This head is in constant rotation and is connected to the store of an electronic computer through the medium of a rotating transformer (not shown in the drawings).

The head 1, which is of cylindrical form, has a plane reading face 2 comprising a plurality of transducer elements 48 sensitive to the magnetic variations and disposed in such manner as to permit the reading of concentric circular record tracks. The face 2 moreover has formed therein a cylindrical recess 3 coaxial with the head cylinder.

A very thin diaphragm 4 of nonmagnetic material (for example bronze) is held in a fixed position over the face 2 of the head for the purpose of preventing wear of the record to be read which would otherwise be caused by the head. The diaphragm 4 has a hole 5 registered with the recess 3.

A circular ticket or card presser 6 (FIG. 2) is located over the diaphragm 4 in a position coaxial with the cylinder 1 and is movable axially towards the diaphragm to press against the record 7 and straighten or flatten it when it has been inserted in the arrangement so that it is located over the diaphragm 4.

The ticket or card presser 6 forms part of a positioning means which also comprises a cylindrical centering plunger or peg 8 coaxial with the head 1 and movable axially towards the head. The forward end of this peg is conically tapered, with a rounded tip, to permit the peg to mate in the hole 5 in the diaphragm and in the cylindrical recess 3 in the head.

The centering peg 8 and the card presser 6 are coaxial with one another and are slidable along a fixed cylindrical guide 9.

The record which is read in this arrangement may be in the form of a ticket (FIG. 1*a*) or in the form of a card (FIG. 1*b*).

The ticket, which is generally made of pasteboard or plastics material and is of rectangular form, has a register hole 10 of the same size as the hole 5 in the diaphragm and is divided transversely into two parts by a perforated line 13 which enables the upper part to be detached easily from the lower part by tearing by hand. Assuming that the ticket is used in a large store for marking the goods on sale, its upper part will be attached to the individual article on sale, for example by means of an eyelet; some wording, for example the name of the article on sale, the serial number, type, price, etc., will be written or printed on one side of the ticket (this wording being duplicated on the two parts of the ticket, that is the upper part which remains attached to the article to which it belongs and the lower part which is torn off). The opposite side of the ticket bears a magnetizable coating on which the same data as is written on the said one side of the ticket is recorded by means of a suitable recording apparatus by employing a plurality of circular record tracks (for example 11 and 12) concentric with the register hold 10.

The record of the card type (FIG. 1*b*) is generally used for other purposes, for example as an identity card or a credit card. This record is usually made from a film of plastics material which bears on one of its faces an area 14 covered with a magnetizable coating. In this area there is formed a register hole 15 around which the necessary identification particulars are recorded in concentric tracks (for example 16 and 17).

When the ticket 7 (that is the torn-off part bearing the magnetic record) is to be read, it is held in a vertical position and inserted from above into the positioning arrangement between the diaphragm 4 and the ticket presser 6 along suitable guides 18, 19 until it reaches the position shown in FIG. 3. A card, on the other hand, is inserted into the arrangement laterally, while holding it in a vertical position, between suitable guides 20, 21, the end 19 of the guide 21 being lifted away resiliently to allow the card to pass, the card being pushed until it is against the guide 18.

The introduction of the ticket or card into the positioning and reading arrangement gives rise to a series of successive operations, both mechanical and electrical, which will be described briefly. More particularly, the cycle relating to each individual record comprises three successive stages of centering and clamping, reading and ejection.

Referring to the case in which the record is constituted by a ticket 7, there will now be described both the mechanism which effects the centering and clamping of the ticket by means of a centering frame and effects the ejection of the same by means of an ejection frame, and the operation of the mechanism from the kinematic point of view.

The ticket 7, held in a vertical position as has already been said, is inserted manually by the operator from above into a slot which is defined on the right and left by the guides 18 and 19 and at the rear by the diaphragm 4. The ticket is pushed downward until the operator hears a click produced by a trip frame which is described below. If the operator pushes the ticket too hard, it will in any case be arrested against a trap door 22. At this point, the operator must remove the manual pressure so that the operations of the apparatus can continue automatically.

The card 7, being inserted and pushed along the guides 18, 19 and the diaphragm 4, touches and displaces with its bottom right-hand corner (in the drawing) a roller 23 mounted on a trip frame 24. This frame is forced to turn about a spindle 25, producing a sequence of operations which will now be described.

A lug 26 on the trip frame 24 actuates a microswitch 27, closing it and thus causing the transmission to the electronic part of the apparatus of a signal indicating the near beginning of a reading cycle. The microswitch 27 remains closed until the end of the cycle of operations concerning the ticket introduced, that is to say until the final return of the whole apparatus to the inoperative state.

The trip frame 24 moreover sets in action a centering frame 28 movable about a spindle 29 and urged against a lug 31 of the trip frame by a return spring 30. The rotation of the trip frame about the spindle 25 moves the lug 31 away from a tongue 35 of the centering frame 28, which is therefore released and turns under the effect of the spring 30 and pushes the centering peg 8 forward, the centering peg being connected to the centering frame by means of a pin 32 engaged in a slot 33.

As the ticket 7 which has been inserted in the arrangement until it causes the tripping of the frame 24 has thus been brought into a position such that its own hole 10 is almost coaxial with the hole 5 in the diaphragm 4, the conical tip of the centering peg 8 will advance into the hole 10 and thereby center the ticket.

In order to ensure that the trip frame 24, whose roller 23 is pressed against the edge of the ticket 7 under the action of a return spring 34 and of the microswitch 27, does not interfere with the centering of the ticket, the centering frame 28 has its tongue 35 suitably inclined so that, as the tongue 35 advances during the rotation of the frame 28, it presses vertically on the lug 31 and causes a further movement of the trip frame 24, which is thus moved away from the ticket 7.

When the centering frame 28 is almost at the end of its stroke, that is to say when the centering peg 8 has already completed its function, having already introduced its cylindrical portion into the hole 10 in the ticket, the hole 5 in the diaphragm and the cylindrical recess 3 in the head, a fork-controlling latch 36 is released. This latch is pivoted on a spindle 37 and is normally held in engagement with a fork 38 controlling the ticket presser by a return spring 39. The release of the latch 36 from the fork 38 takes place when the frame 28 in the course of its rotary movement presses against the arm 46 of said latch.

The fork 38 controlling the ticket presser serves to hold the ticket presser 6 in the inoperative position by pressing against a flange 40 of the presser and opposing the action of a thrust spring 41. The fork 38 is pivoted on a horizontal spindle 42 and carries at the bottom a leaf spring 43 which serves to close a waiting compartment defined by the leaf spring and by a fixed wall 44. The waiting compartment serves to retain temporarily the ticket which has been read in the preceding cycle, so as to have it still available in case of necessity of rereading or of rejection.

The release of the fork 38 therefore produces a rotation thereof about the spindle 42 due to the effect of a return spring 47, so that the waiting compartment is opened by the lifting of the leaf spring 43 and the ticket located in the waiting compartment is allowed to drop into the general collecting space.

Moreover, the release of the fork 38 allows the free advance of the ticket presser 6 under the thrust of the spring 41; the ticket presser 6 advances until it squeezes the ticket against the diaphragm 4, flattening the ticket, and then, overcoming the action of a pair of springs 45 bearing against the diaphragm support 49, it carries the ticket and the diaphragm against the face 2 of the reading head 1, keeping them clamped in this position. As soon as the reading head (which is in constant rotation) recognizes the start-of-message signal contained on the magnetic record tracks, it proceeds to read the data contained in these tracks and transmits the same to the store of the electronic part of the apparatus.

For correct reading, it is essential to ensure a perfect bearing action between the surfaces of the ticket, the diaphragm and the head. To this end, the ticket presser 6 is mounted sufficiently loosely to its guide 9 to permit transverse oscillating movements and the diaphragm 4 is rendered capable of oscillating by means of the resilient support formed by the pair of springs 45 connecting the diaphragm support 49 to the fixed part of the arrangement, so that the ticket presser and the diaphragm are able to adapt themselves to the face 2 of the reading head. If vibrations are not to be produced, strict perpendicularity is required for the face 2 with respect to the axis of rotation of the head itself.

The diaphragm 4, which is welded to the support 49, must be very thin, so as to limit to the minimum that is possible the gap which weakens the reading signal.

FIG. 3 shows the state of the device during the stage when the ticket is being read by the head.

As has been explained hereinbefore, the closing of the microswitch 27 causes the transmission to the electronic equipment of a signal giving warning of the imminent start of a reading cycle; this signal prepares the logic reading circuits. Following this, with a delay sufficient to permit the completion of all the movements of positioning and arresting the ticket pressed against the diaphragm and the head, the reading operations are made possible and begin when the start-of-message character is recognized on the first track to be read; the reading of the end-of-message character on the first track permits the reading of the second track, which takes place in a similar manner to that of the first track. The end-of-message character of the second track also constitutes the signal indicating the end of the whole message recorded on the ticket.

In the event of the reading operations having been carried out successfully, in order to limit wear of the diaphragm as much as possible, as soon as the message read on the ticket has been transferred to the store of the electronic equipment, the latter transmits back to the arrangement a signal which energizes a resetting solenoid 50. The energization of this solenoid draws in its armature 51, which sets in operation a mechanism producing the resetting of the positioning arrangement.

Thus the armature 51 pulls a bellcrank lever 52 and causes it to turn about a spindle 53 in opposition to the action of a spring 54. Consequently, an arm 55 of the lever 52 presses on a reset bar 56 by means of a pin 57 and compels this bar to be lowered against the action of a spring 59 until a pin 61 at the end of the bar engages in a worm 62, which rotates continuously in the direction indicated by the arrow. It is to be noted that the reset lever 56 is pivoted on a vertical spindle 58 which permits a horizontal rotary movement and is moreover adapted to perform limited oscillating movements in a vertical direction which are made possible by the coupling of the pivot 58 with a slot 60.

The engagement of the pin 61 with the worm 62 causes the lever 56 to be rotated in the horizontal plane about the pivot 58 until the pin 61 reaches the end 63 of the worm.

In the course of its rotation, the lever 56 pulls back a reset bar 64, which has a log 66 engaged in a slot 65 in the lever 56. The bar 64 is slidable horizontally on pins 67 and 68 passing through slots 69 and 70. During the first portion of its horizontal stroke, the reset bar 64 engages the centering frame 28 by means of a shoulder 71 and retracts the frame 28, so that the peg 8 is withdrawn from the hole 10 in the ticket 7 and the centering frame 28 can resume its inoperative position.

The bar 64 also rotates a control frame 72 comprising two levers fixed to a shaft 42, in opposition to the action of a return spring 73. The frame 72 in turn rotates a resiliently coupled reset frame 74, which is movable about the shaft 42 and is connected to the frame 72 by means of a spring 75. Consequently, there are two effects: the resiliently coupled frame 74, having a projection 76 which engages the trap door 22, causes the latter to turn about pivots 77 and open the waiting compartment (to which reference has been made hereinbefore) to let the ticket 7 drop into this compartment; moreover, the resiliently coupled frame 74 has an abutment 78 which engages the fork 38 controlling the ticket presser, carrying this fork along in a rotary movement which is opposite to that performed during the first stage of positioning of the ticket. The fork 38 in turn brings the ticket presser 6 back into the inoperative position by acting on the flange 40. It should be noted that the return of the fork to the inoperative position automatically entails the closing of the waiting compartment for the ticket by means of the leaf spring 43.

During the rotary movement of the control frame 72 hereinbefore described, this frame tensions a spring 79 connecting it to an ejector frame 80, whereby the latter performs a limited rotation together with a shaft fast therewith and forming the pivot 21, overcoming a weak spring 81 which holds it at rest, until it engages against a control latch 82, which prevents any furthe. rotation.

At this point, the ticket would already be able to drop by gravity, but it is restrained by the roller 23 of the trip frame 24 which, no longer moved away by the tongue 35 of the centering frame 28 which has by now returned to the inoperative position, bears on the ticket.

During the second portion of its stroke, the reset bar 64 continues to cause the control frame 72 to rotate and therefore the movement of the resiliently coupled frame 74 continues and the spring 79 of the ejector frame 80 continues to be loaded (while the centering frame 28 is urged beyond the inoperative position and performs an additional travel to the rear).

At a certain point in this stage, the control frame 72 pulls down a tie rod 84 whose end engages in a slot 83, in the frame 72. The tie rod again rotates the trip frame 24, disengaging it from the ticket 7, which is therefore free to drop.

Thereafter, the bar 64 encounters the latch 82 of the ejector frame by means of an abutment surface 85 and, overcoming the action of a return spring 86, causes the rotation of the latch about the pivot 87, so that the latch is disengaged from the ejector frame 80. Due to the action of the spring 79 which has been loaded during the preceding stages, the ejector frame rotates rapidly and a toothed sector 88 (rigidly connected thereto) causes the simultaneous rotation of an ejection crank 89, which strikes the ticket 7, driving it into the waiting compartment (if it has not already dropped through gravity), where it will remain until the next ticket is read. The rotation of the toothed sector 88 (and therefore of the crank 89 about its pivot 90) is limited by a coupling formed by a fixed pin 91 and a slot 92.

The reset bar 64 reaches the limit of its stroke when the lever 56 reaches the end of its rotation under the action of the worm 62 (that is to say when the pin 61 reaches the end 63 of the thread). This final position persists as long as the energization of the reset solenoid 50 lasts.

Under these conditions, the pin 93 of the ejection crank, which has been lowered towards the space for introducing the ticket, bars access thereto and acts as an obstacle preventing the introduction of another ticket.

The energization of the solenoid 50 is terminated at the command of the electronic equipment after it has received the messages read on the ticket, and as soon as the energization ceases all the mechanisms return to their inoperative state under the action of their return springs.

In particular, during the return travel of the reset lever 64, the trip frame 24 reaches its inoperative position before the centering frame 28, so that reengagement of the two parts by means of the tongue 35 and the lug 31 as shown in FIG 2 is ensured.

For reasons of simplicity, in the foregoing description and in FIG. 2 the microswitch 27 has been described and shown as being actuated by the trip frame 24 by means of the lug 26. However, if it is desired to achieve greater reliability, that is to say if it is desired that the signal warning of the commencement of a reading cycle be transmitted to the electronic part of the equipment only when the ticket has already been positioned, this microswitch would have to be actuated by the latch 36, which is disengaged only when the centering peg 8 has already completed its work.

It should moreover be noted that if, during the manual introduction of the ticket, it is not left free to adjust itself, that is to say as long as the operator maintains the pressure of his fingers and forces the ticket into an offcenter position, the peg 8 cannot enter the hole 10 in the ticket fully and, therefore, in spite of the centering frame 28 having been tripped, the positioning operations are obstructed.

The waiting compartment enables the operator to recover the ticket previously read easily when the electronic part of the equipment has indicated malfunctioning as a result of the reading and therefore requires the operator to arrange for rereading of the ticket or for any other necessary operation.

In the case of the reading of a record of the card type, the stages of positioning, reading and ejection are the same as those described for the case of a record of the ticket type, subject to the following differences.

As already described, the card is introduced into the reading slot laterally with a horizontal movement from left to right (with respect to the drawing); at the end of its travel, the card actuates the trip frame with its bottom right-hand edge.

As the card is longer than the ticket, it does not drop into the waiting compartment, and as it is also of greater height than the ticket it receives the blow of the ejection crank at a different angle, the ejection crank therefore pushing the card to the left and thus indicating visibly to the operator that the reading has taken place. The card is then withdrawn by hand.

The card may have dimensions varying within wide limits, provided that the position of the register hole and of the corresponding magnetic tracks with respect to the bottom right-hand corner of said card is constant. Finally, it is observed that in the foregoing description it has been assumed that a diaphragm 4 of nonmagnetic material is interposed between the reading head 1 and the record to prevent rapid wear of the record itself by the head, which is in constant rotation and would otherwise rub against the surface of the record for a longer time than is necessary for reading, because of the time required for the positioning and mechanical-ejection operations.

If however, records are available in which the magnetizable coating carrying the record tracks is produced with sufficiently resistant oxides, the protective diaphragm 4 may be dispensed with, in which case electrical reading signals of higher level will be obtained from the head and the causes of disturbance or interference which are due to imperfect flatness of the record, the diaphragm and the head will be eliminated. If the protective diaphragm 4 (which is welded to its oscillating support 49) is dispensed with, it will, however, be expedient to retain the support as an opposing or bearing plate, in order to facilitate the flattening of the record in the stage in which it is clamped against the head, and as a guide for introducing the record into the reading space.

It is to be understood that the invention is not limited to the particular embodiments and features described and shown, but that it comprises any modifications and equivalents within the scope of the appended claims.

We claim:

1. Apparatus for automatically positioning in a reading apparatus a magnetizable record of the ticket or card type having a register hole and one or more record tracks concentric with said hole, which comprises:
- a reading head having a rotary movement relative to the record and adapted to read said tracks;
- a plunger having a conical tip, the plunger being coaxial with the reading head with the tip's end point pointing toward the reading head;
- means for moving the plunger axially toward the head to align the hole in the record with respect to the head; and
- clamping means arranged to move toward the reading head when the plunger has centered the record so as to clamp the record against the head, said clamping means including:
- a card presser axially aligned with said reading head,
- a spring means for urging said card presser toward said reading head,
- a latch means for normally restraining said card presser from moving under the action of said spring means, and
- means for releasing said latch upon the insertion into the apparatus of a record member so that said spring means urges the card presser axially toward the reading head.

2. Apparatus for automatically positioning in a reading apparatus a magnetizable record of the ticket or card type having a register hole and one or more record tracks concentric with said hole, which comprises:
- a reading head having a rotary movement relative to the record as well as to a point in space and adapted to read said tracks;
- a plunger having a conical tip, the plunger being coaxial with the reading head with the tip's end point pointing toward the reading head;
- means for moving the plunger axially toward the head to align the hole in the record with respect to the head, said plunger moving means including:
- a centering frame secured to the rear end of the plunger,
- a spring means for urging the centering frame and the plunger toward the reading head,
- trip frame means for normally blocking the movement of the centering frame, and
- means, responsive to the insertion of a record member, for moving said trip frame into a nonblocking position; and
- clamping means for clamping said record between said reading head and said clamping means.

3. Apparatus as recited in claim 2, which further comprises: means for withdrawing said plunger to an inoperative position at the end of a reading cycle, said means including:
- a reset bar for engaging the centering frame upon rearward movement of said bar; and
- means for moving said reset bar rearwardly away from the reading head upon completion of a reading cycle to move the centering frame and associated plunger away from the record member.

4. Apparatus as recited in claim 3, which further comprises:
- a trap door positioned beneath said reading head and said clamping means for temporarily retaining said record member in the reading position; and
- means for displacing the trap door to release the record member after said clamping means and plunger have been moved into inoperative positions.

5. Apparatus as recited in claim 4, wherein said trap door is pivotally mounted, and wherein said displacing means includes:
- a reset frame having a projection which engages said trap door; and
- means connecting the reset frame to the reset bar for rotating the reset frame as the reset bar is moved rearwardly to swing the trap door about its pivot and thereby open it.

6. Apparatus as recited in claim 3 which further comprises:
- means for positively ejecting said record member which includes:
- an ejector crank positioned adjacent said reading head and clamping means; and
- means operatively associated with said reset bar for moving the ejector crank past the reading position of the record member after the plunger and clamping means have been moved into an inoperative position.

7. Apparatus for positioning, clamping, and reading a record member, said member having a positioning aperture, comprising:
- means for reading said record;
- means for positioning said record with respect to said reading means, including:
- rod means for entering said positioning aperture, an extremity of said rod having a conical tip and pointing toward said reading means, and
- means for moving said rod toward said reading means through said positioning aperture and
- means for clamping said record against said reading means after said record has been positioned by said positioning means so that said record is held between said clamping means and said reading means, said clamping means including:
- means for pressing said record against said reading means,
- spring means for urging said pressing means toward said reading means,
- latch means for normally restraining said pressing means from moving under action of said spring means, and
- means for releasing said latch means so that said spring means forces said pressing means to move toward said reading means, said releasing means being activated by the introduction of said record between said reading means and said clamping means.